US 008407511B2

(12) United States Patent
Mobin et al.

(10) Patent No.: US 8,407,511 B2
(45) Date of Patent: Mar. 26, 2013

(54) METHOD AND APPARATUS FOR GENERATING EARLY OR LATE SAMPLING CLOCKS FOR CDR DATA RECOVERY (75) Inventors: Mohammad S. Mobin, Orefield, PA (US); Kenneth W. Paist, Spring City, PA (US); Lane A. Smith, Easton, PA (US); Paul H. Tracy, Schnecksville, PA (US); William B. Wilson, Macungie, PA (US)

(73) Assignee: Agere Systems LLC, Allentown, PA (US)

( * ) Notice: Subject to any disclaimer, the term of this patent is extended or adjusted under 35 U.S.C. 154(b) by 614 days.

(21) Appl. No.: 12/199,904

(22) Filed: Aug. 28, 2008

(65) Prior Publication Data

US 2010/0054383 A1    Mar. 4, 2010

(51) Int. Cl.
H04L 7/00     (2006.01)
G06F 1/00     (2006.01)

(52) U.S. Cl. ............................ 713/500; 713/503; 375/371

(58) Field of Classification Search .................. 713/503, 713/500; 375/371
See application file for complete search history.

(56) References Cited

U.S. PATENT DOCUMENTS

| | | | | |
|---|---|---|---|---|
| 4,520,489 A * | 5/1985 | Hogge, Jr. | ..................... | 375/233 |
| 4,583,234 A * | 4/1986 | Ramadan | ..................... | 375/232 |
| 4,985,902 A * | 1/1991 | Gurcan | ..................... | 375/233 |
| 5,247,544 A * | 9/1993 | LaRosa et al. | ................ | 375/371 |
| 5,737,589 A * | 4/1998 | Doi et al. | ..................... | 713/503 |
| 5,948,083 A * | 9/1999 | Gervasi | ............................ | 710/62 |
| 5,963,599 A * | 10/1999 | Curtis et al. | ................. | 375/341 |
| 6,380,774 B2 * | 4/2002 | Saeki | ............................. | 327/119 |
| 6,424,592 B1 * | 7/2002 | Maruyama | ................. | 365/233.1 |
| 6,424,684 B1 * | 7/2002 | Baker | ............................. | 375/340 |
| 6,665,308 B1 * | 12/2003 | Rakib et al. | .................... | 370/441 |
| 6,762,626 B1 * | 7/2004 | Dreps et al. | ........................ | 327/2 |
| 6,987,803 B2 * | 1/2006 | Frenkel et al. | ................ | 375/232 |
| 6,987,804 B2 * | 1/2006 | Buchali et al. | ................ | 375/233 |
| 7,006,565 B1 * | 2/2006 | Endres et al. | ................. | 375/233 |
| 7,010,074 B2 * | 3/2006 | Nakamura | .................... | 375/371 |
| 7,038,510 B2 * | 5/2006 | Zhang | ........................... | 327/158 |
| 7,161,980 B2 * | 1/2007 | Dittrich et al. | ................ | 375/233 |
| 7,184,477 B2 * | 2/2007 | Haunstein et al. | ........... | 375/233 |
| 7,263,122 B2 * | 8/2007 | Stonick et al. | ................ | 375/232 |
| 7,376,857 B2 * | 5/2008 | Lee et al. | ...................... | 713/401 |
| 7,403,584 B2 * | 7/2008 | Koenenkamp | ................ | 375/371 |
| 7,454,647 B1 * | 11/2008 | Devnath et al. | .............. | 713/500 |
| 7,580,452 B2 * | 8/2009 | Lai | ................................ | 375/232 |

(Continued)

FOREIGN PATENT DOCUMENTS

WO        WO 9714214 A1 *   4/1997

*Primary Examiner* — Paul R Myers (74) *Attorney, Agent, or Firm* — Ryan, Mason & Lewis, LLP (57)  ABSTRACT

Methods and apparatus are provided for a clock phase generator for CDR data sampling that generates early and/or late sampling clocks, relative to ideal transition and sample points. An early sampling clock is generated by generating a plurality of transition and data sampling clock signals having a substantially uniform phase separation; and delaying at least one of the transition clock signals to generate one or more early clock signals. A late sampling clock is generated by generating a plurality of transition and data sampling clock signals having a substantially uniform phase separation; and delaying at least one of the data sampling clock signals to generate one or more late clock signals. The early clock signals can be employed, for example, in a threshold-based decision feedback equalizer. The late clock signals can be employed, for example, in a classical decision feedback equalizer.

21 Claims, 8 Drawing Sheets

U.S. PATENT DOCUMENTS

| | | | |
|---|---|---|---|
| 7,617,409 B2* | 11/2009 | Gilday et al. | 713/503 |
| 7,924,912 B1* | 4/2011 | Rokhsaz et al. | 375/233 |
| 2002/0060820 A1* | 5/2002 | Buchali | 359/109 |
| 2005/0238093 A1 | 10/2005 | Payne et al. | |
| 2006/0109940 A1* | 5/2006 | Beukema et al. | 375/350 |
| 2006/0203900 A1* | 9/2006 | Koralek | 375/233 |
| 2006/0234662 A1* | 10/2006 | Diloisy | 455/273 |
| 2007/0109163 A1* | 5/2007 | Lai | 341/143 |
| 2008/0005629 A1 | 1/2008 | Windler et al. | |
| 2008/0069199 A1* | 3/2008 | Chen et al. | 375/233 |
| 2008/0310495 A1 | 12/2008 | Bulzacchelli et al. | |

* cited by examiner

METHOD AND APPARATUS FOR GENERATING EARLY OR LATE SAMPLING CLOCKS FOR CDR DATA RECOVERY

FIELD OF THE INVENTION

The present invention relates generally to clock generation techniques for digital communications, and more particularly, to techniques for generating clock signals with early or late transitions, relative to an ideal clock signal, for use in data recovery.

BACKGROUND OF THE INVENTION

In many applications, including digital communications, clock and data recovery (CDR) must be performed before data can be decoded. Generally, in a digital clock recovery system, a reference clock signal of a given frequency is generated together with a number of different clock signals having the same frequency but with different phases. In one typical implementation, the different clock signals are generated by applying the reference clock signal to a delay network. Thereafter, one or more of the clock signals are compared to the phase and frequency of an incoming data stream and one or more of the clock signals are selected for data recovery.

A number of existing digital CDR circuits use voltage controlled delay loops (VCDL) to generate a number of clocks having the same frequency and different phase for data sampling (i.e., oversampling). For example, published International Patent Application No. WO 97/14214, discloses a compensated delay locked loop timing vernier. Generally, the disclosed timing vernier produces a set of timing signals of similar frequency and evenly distributed phase. An input reference clock signal is passed through a succession of delay stages. A separate timing signal is produced at the output of each delay stage. The reference clock signal and the timing signal output of the last delay stage are compared by an analog phase lock controller. The analog phase lock controller controls the delay of all stages so that the timing signal output of the last stage is phase locked to the reference clock. Based on the results of the oversampled data, the internal clock is delayed so that it provides data sampling adjusted to the center of the "eye." The phase of the VCDL is adjusted to keep up with phase deviations of the incoming data.

Figure 1:
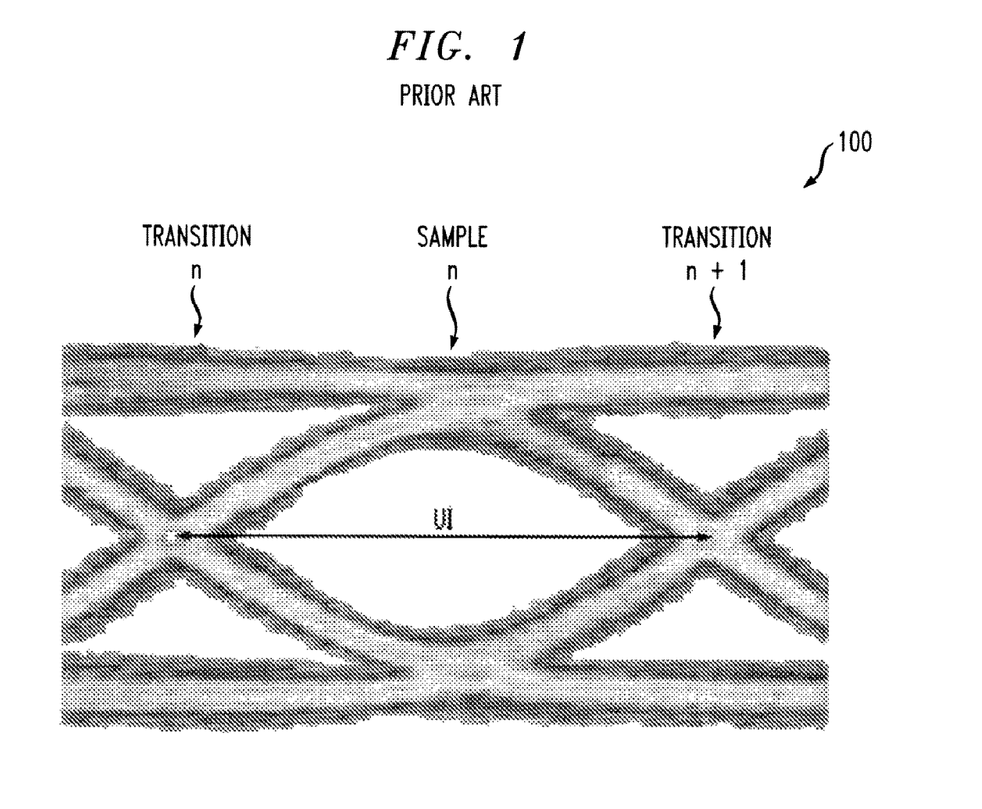
FIG. 1 illustrates transitions in a data stream.

FIG. 1 illustrates the transitions in a data stream 100. As shown in FIG. 1, the data is "ideally" sampled in the middle between two transition points. The phases generated by the VCDL are adjusted to align with the transitions and sample points, respectively. Thus, the internal clock is typically delayed so that the data sampling is adjusted to the center of the "data eye," in a known manner. Such uniformly spaced transition and data sampling clock phases are generally considered useful under "ideal" circumstances.

In practice, however, it may be desirable to position the data sampling position either earlier or later than the "ideal" transition and sample points. For example, in threshold-based Decision Feedback Equalization (DFE) it is desirable to move the data sampling position earlier. Likewise, in classical DFE implementations, transients in the intersymbol interference (ISI) correction circuitry may not settle by the time when the "ideal" data sampling clock phase is generated. Thus, for classical DFE implementations, it may be desirable to delay the data sampling phase clock by moving the data sampling position later.

A need therefore exists for methods and apparatus for a clock phase generator for CDR data sampling that generates early and/or late sampling clocks, relative to "ideal" transition and sample points.

SUMMARY OF THE INVENTION

Generally, methods and apparatus are provided for a clock phase generator for CDR data sampling that generates early and/or late sampling clocks, relative to "ideal" transition and sample points. According to one aspect of the invention, an early sampling clock is generated by generating a plurality of transition and data sampling clock signals having a substantially uniform phase separation; and delaying at least one of the transition clock signals to generate one or more early clock signals. The delaying step typically delays the transition clock signals with respect to the data sampling clock signals. The delaying of the at least one of the transition clock signals serves to advance at least one of the data sampling clock signals. The one or more generated early clock signals can be employed, for example, in a threshold-based decision feedback equalizer.

According to another aspect of the invention, a late sampling clock is generated by generating a plurality of transition and data sampling clock signals having a substantially uniform phase separation; and delaying at least one of the data sampling clock signals to generate one or more late clock signals. The delaying step typically delays the data sampling clock signals with respect to the transition clock signals. The one or more generated late clock signals can be employed, for example, in a classical decision feedback equalizer.

In one implementation, a delay amount introduced by the delaying step to generate the early or late clocks can be increased until a predefined stopping criteria is satisfied. The predefined stopping criteria may evaluate, for example, a noise margin. The introduced delay amount can be a fixed or dynamic delay amount.

A more complete understanding of the present invention, as well as further features and advantages of the present invention, will be obtained by reference to the following detailed description and drawings.

DETAILED DESCRIPTION

The present invention provides a CDR clock phase generation scheme where the data and transition sampling clocks are not uniformly spaced. Among other benefits, the disclosed invention allows the timing margin and thus total jitter tolerance performance of a CDR to be optimized.

Conventional CDR Clock Phase Generation

Figure 2:
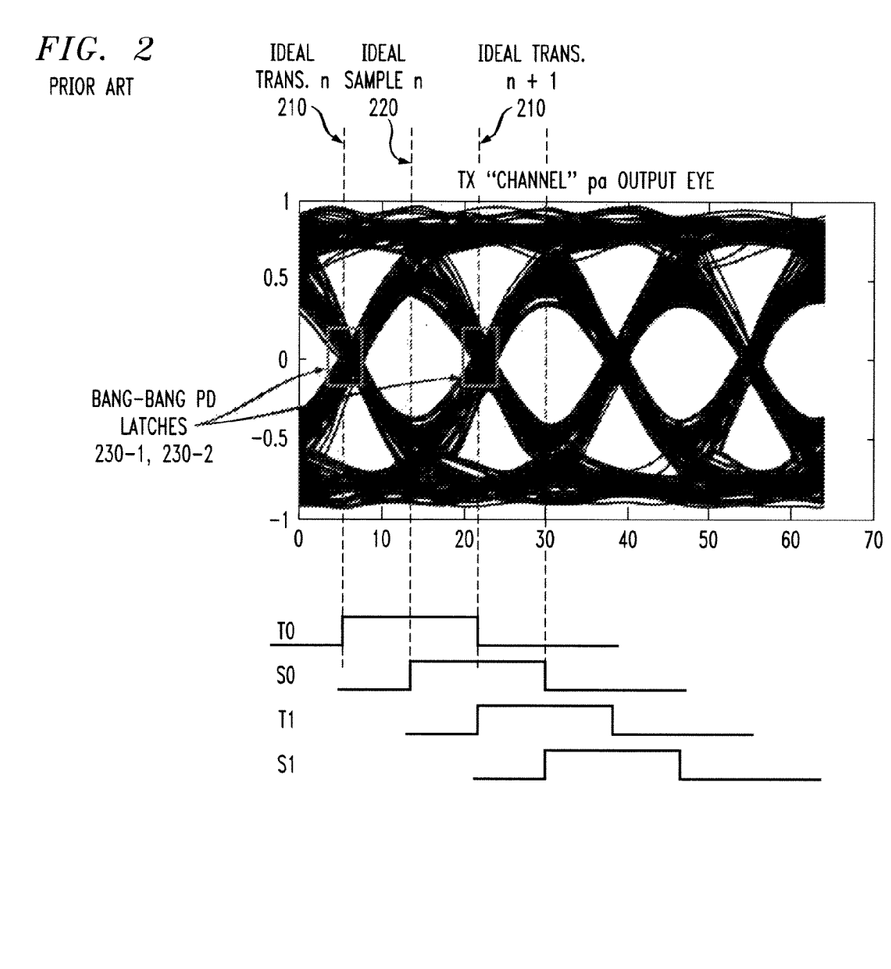
FIG. 2 illustrates positioning of transition and sampling points in a CDR system.

FIG. 2 illustrates the positioning of the transition and sampling points in a CDR system. As shown in FIG. 2, the transition and sampling clocks T0, S0, T1, S1 are aligned with the "ideal" transition and sample points 210, 220, respectively. In the embodiment shown in FIG. 2, the incoming signal is sampled by two Bang-Bang phase detector latches 230-1, 230-2, in a known manner. Generally, after the CDR locks, the clock generators will uniformly position clock edges to edge crossings (T0 and T1) and data sampling positions (S0 and S1).

Figure 3:
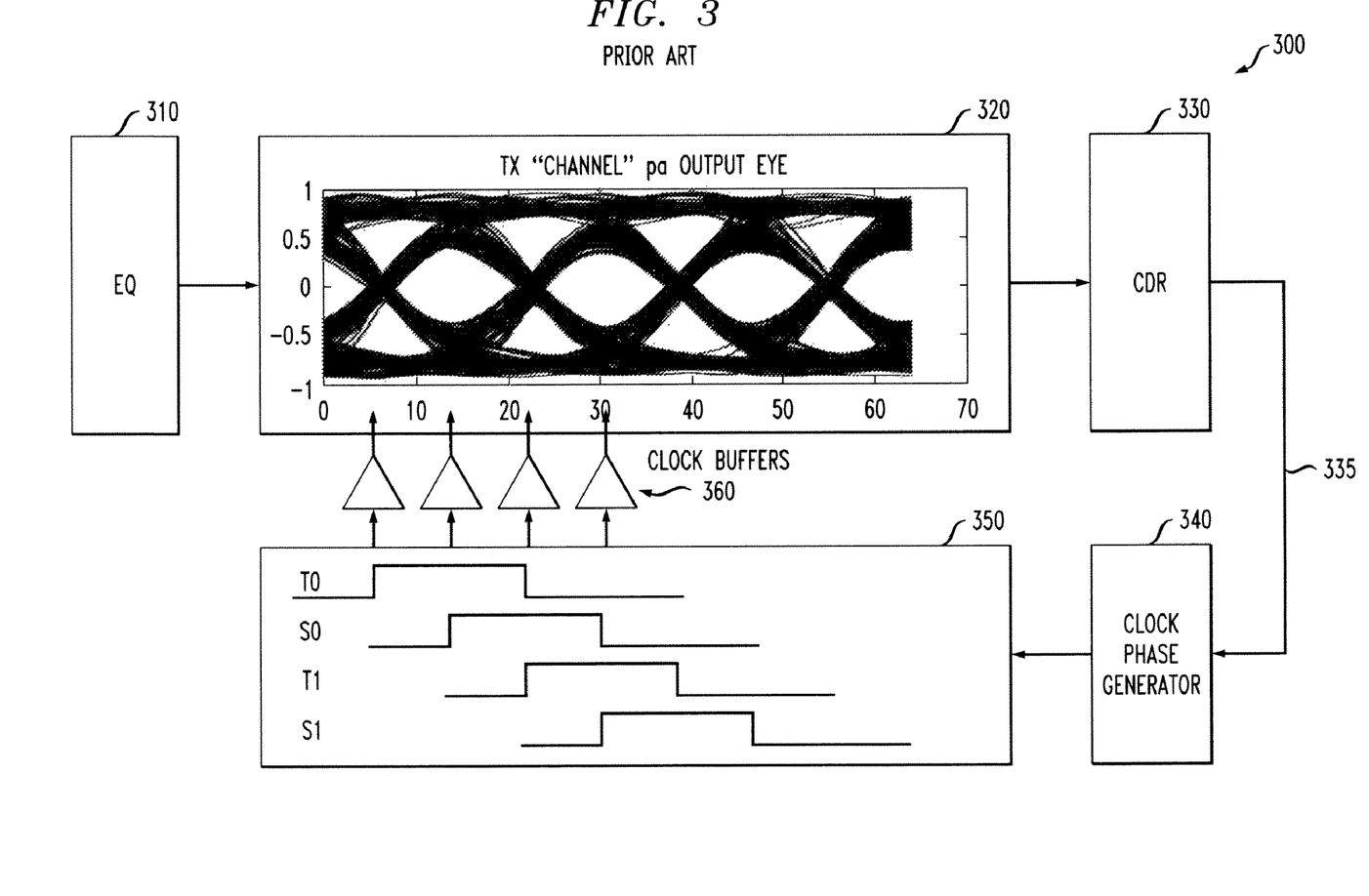
FIG. 3 illustrates a classical CDR clock phase generator.

FIG. 3 illustrates a classical CDR clock phase generator 300. As shown in FIG. 3, a received signal is equalized by an equalizer 310, such as an adaptive equalizer. A CDR 330 processes the equalized signal 320 and generates a reference clock signal 335 of a given frequency. An ideal clock phase generator 340 generates uniformly spaced clocks 350. For example, the clock phase generator 340 may generate the different clock signals by applying the reference clock signal 335 to a delay network. The generated clocks 350 are applied to clock buffers 360 that are trimmed to compensate for mismatches at the output of the clock generator 340. Generally, the CDR 330 will lock to the transition points, Tn, and the sample points, Sn, will move accordingly.

Improved Margins

Need for Early/Late Phases

A communication channel typically exhibits a low pass effect on a transmitted signal, causing the opening size of the received data eye to be significantly impaired, with the received data eye often being essentially closed. Conventional channel compensation techniques attempt to open the received data eye that has been band limited by the low pass channel response. A classical DFE implementation typically places a latch in the middle of the received data eye, which often has a small opening with poor noise and timing margins.

Margins—Definitions

U.S. patent application Ser. No. 11/541,379, entitled "Method and Apparatus for Non-Linear Decision-Feedback Equalization in the Presence of Asymmetric Channel," filed Sep. 29, 2006, and incorporated by reference herein, provides methods and apparatus for determining the position of DFE latches in the presence of a non-linear channel. The non-linearly mapped DFE coefficients generated by the present invention can be used with a classical threshold based DFE structure, as discussed below.

U.S. patent application Ser. No. 11/541,379 positions the vertical slicers using a single sided eye. As used herein, a single-sided eye (also referred to as a DFE eye) contains only transitions from one binary value (i.e., only 1→x or 0→x transitions). The small data eye is the result of the channel distortions that tend to close the data eye. A larger DFE eye can be extracted by constraining the data to only contain signal transitions from, for example, a binary value 1 to a binary value of 0 or 1 (referred to as 1→x), and inhibiting any signal transitions from a binary value of 0.

When the data is constrained to only have 1→x transitions, a significant amount of distortion that would normally be associated with the 0→x transitions is removed and the resulting upper DFE eye is larger than the small data eye associated with a classical approach. Likewise, when the data is constrained to only have 0→x transitions, a significant amount of distortion that would normally be associated with the 1→x transitions is removed and the resulting lower DFE eye is larger than the small data eye associated with a classical approach. In this manner, by inhibiting one set of binary transitions, the size of the data eye is significantly increased, and the noise margin is improved.

Figure 4:
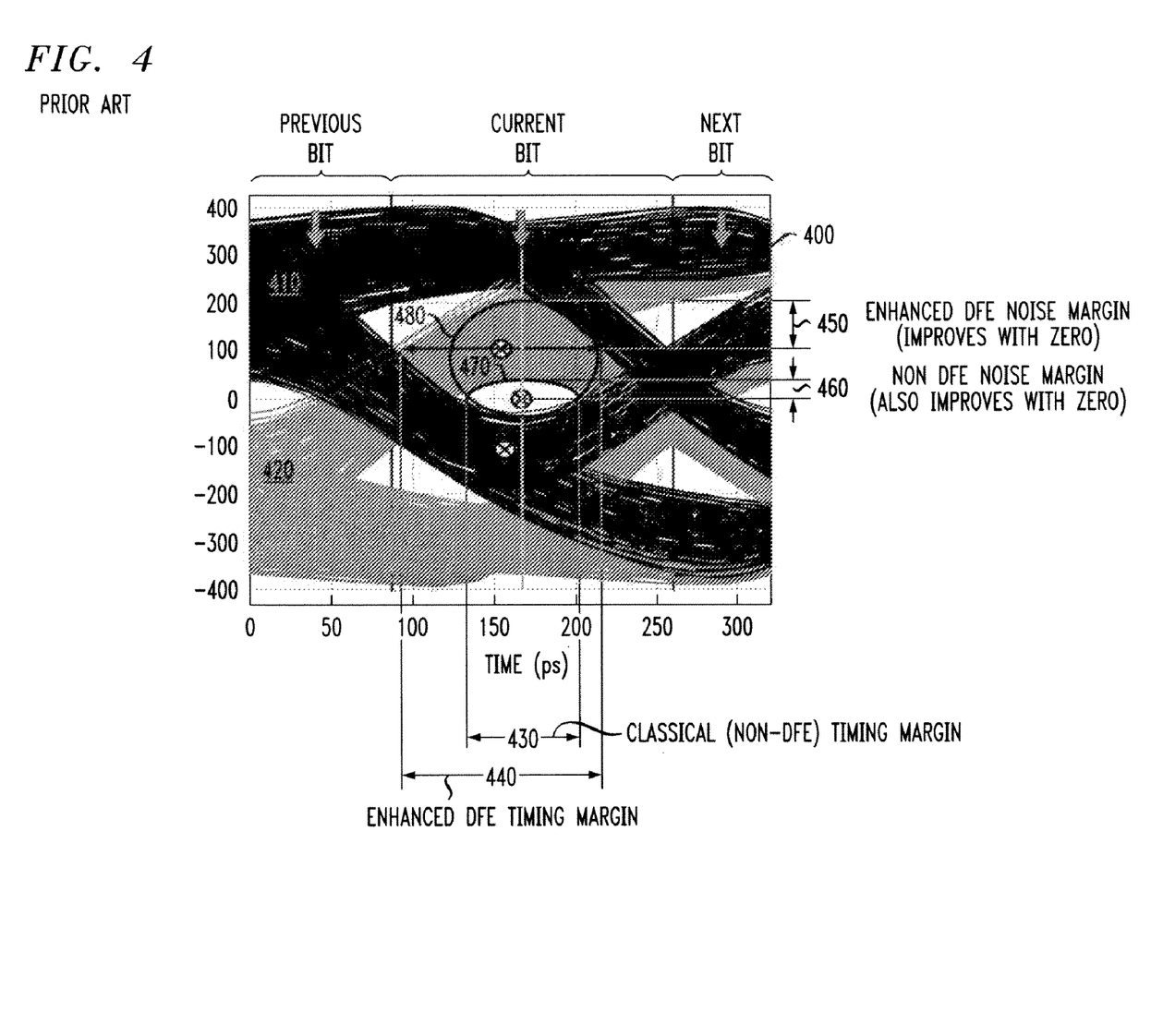
FIG. 4 illustrates noise and timing margins for a received signal.

FIG. 4 illustrates the noise and timing margins for a received signal 400. As shown in FIG. 4, a received signal will typically include transitions 410 from a binary value 1 to a binary value of 0 or 1 (1→x), as well as transitions 420 from a binary value 0 to a binary value of 0 or 1 (0→x). A larger DFE eye can be extracted by constraining the data to only contain signal transitions from, for example, a binary value 1 to a binary value of 0 or 1 (referred to as 1→x), and inhibiting any signal transitions from a binary value of 0 (or vice versa).

As shown in FIG. 4, when the full set of signal transitions is considered, the size of the classical data eye is approximately associated with the inner circle 470, having an associated timing margin 430 and noise margin 460. The small size of the data eye 470 with the corresponding poor margins 430, 460, makes it very difficult to properly recover the transmitted data. When the data is constrained to only have 1→x transitions, the distortion that would normally be associated with the 0→x transitions is removed and the resulting upper DFE eye, approximately associated with the outer circle 480, is larger than the small data eye 470 associated with a classical approach (and both sets of transitions). The upper DFE eye 480 has an associated timing margin 440 and noise margin 450. Thus, by inhibiting one set of binary transitions 410, 420, the size of the data eye 480 is significantly increased, and the timing and noise margins 440, 450 are improved.

Likewise, when the data is constrained to only have 0→x transitions, a significant amount of distortion that would normally be associated with the 1→x transitions is removed and the resulting lower DFE eye is larger than the small data eye associated with a classical approach. In this manner, by inhibiting one set of binary transitions, the size of the data eye is significantly increased, and the noise and timing margins are improved.

Early Clock Placement for Threshold-Based DFE

Figure 5:
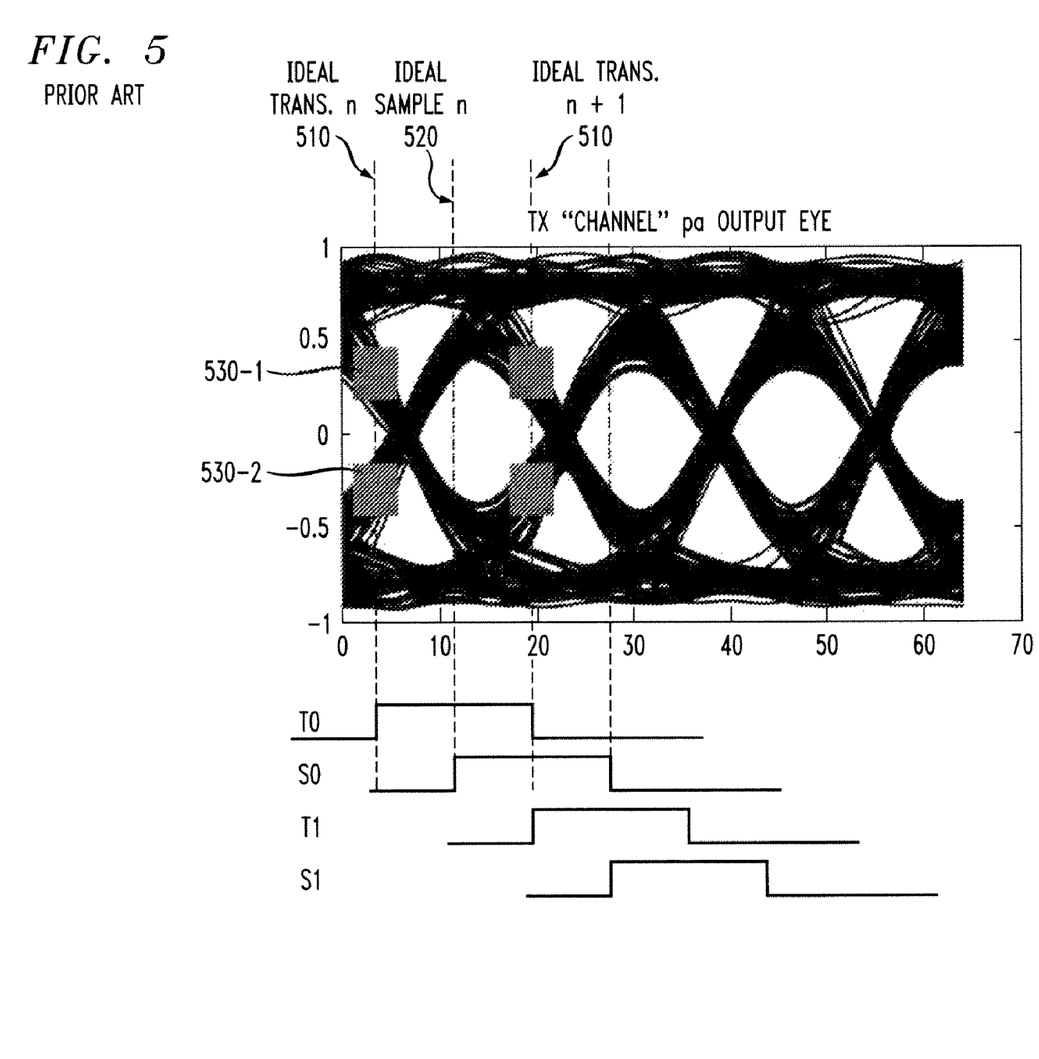
FIG. 5 illustrates positioning of transition and sampling points earlier than "ideal" transition and sample points.

FIG. 5 illustrates the positioning of the transition and sampling points earlier than "ideal" transition and sample points. As shown in FIG. 5, the transition and sampling clocks T0, S0, T1, S1 have been uniformly shifted to an earlier phase, relative to the "ideal" transition and sample points 510, 520, respectively. As previously indicated, in threshold based DFE, the optimal DFE sampling point may be skewed to the left in this manner, compared to classical EYE sampling position. In the conventional embodiment shown in FIG. 5, two transition latches 530-1, 530-2, set at adjustable threshold levels, are employed for each unit interval. Generally, the higher the threshold, the more is the shift in the data sampling position. The configuration shown in FIG. 5 may optimize the sampling position, but it can cause the CDR to lose lock when, at normal operation, the Nyquist pulse falls below the transition latch threshold (due to, e.g., PVT variation).

Late Clock Placement for Classical DFE

As previously indicated, in typical classical DFE implementations, transients in the intersymbol interference (ISI) correction circuitry may not settle by the time when the "ideal" data sampling clock phase is generated. Thus, for classical DFE implementations, it may be desirable to delay the data sampling phase clock by moving the data sampling position later. In a classical Bang-Bang phase detector, for example, the data sampling clock phases may be skewed to right (to a later phase), for example, to reduce the jitter tolerance margin.

Generation of Early/Late Phases

Early Clock Placement

According to one aspect of the present invention, a clock generation technique is provided to advance the data sampling clock phase in time. This early clock generation scheme is useful, for example, for threshold-based DFE applications. As shown in FIG. 4, in threshold-based DFE implementations, when ISI is not subtracted, the DFE eye is skewed to the left. As a result to optimize the timing margin, the data sampling phase should be skewed to the left. The earlier sampling time of the data sampling clock phase will improve the jitter tolerance.

In the disclosed early clock generation technique, a CDR will recover the clocks from the incoming signal. The recovered clock phases will not be uniformly spaced because of device mismatches. The clock buffers are initially trimmed, using known methods, to uniformly space the data and transition latch sampling clock edges. In the next phase, only the transition latch sampling clock phases are delayed by a known delay. Generally, the position of each data sampling clock, Sn, depends on the corresponding transition clock, Tn. Thus, the separation between the data sampling clock edges and transition latch sampling clock edges is reduced. By providing a known delay to all transition edges, the transition edge separation can be kept to one unit interval (UI). The CDR will thus realign the transition clock edges to the data eye, while the data sampling clock phase is brought earlier in time.

Figure 6:
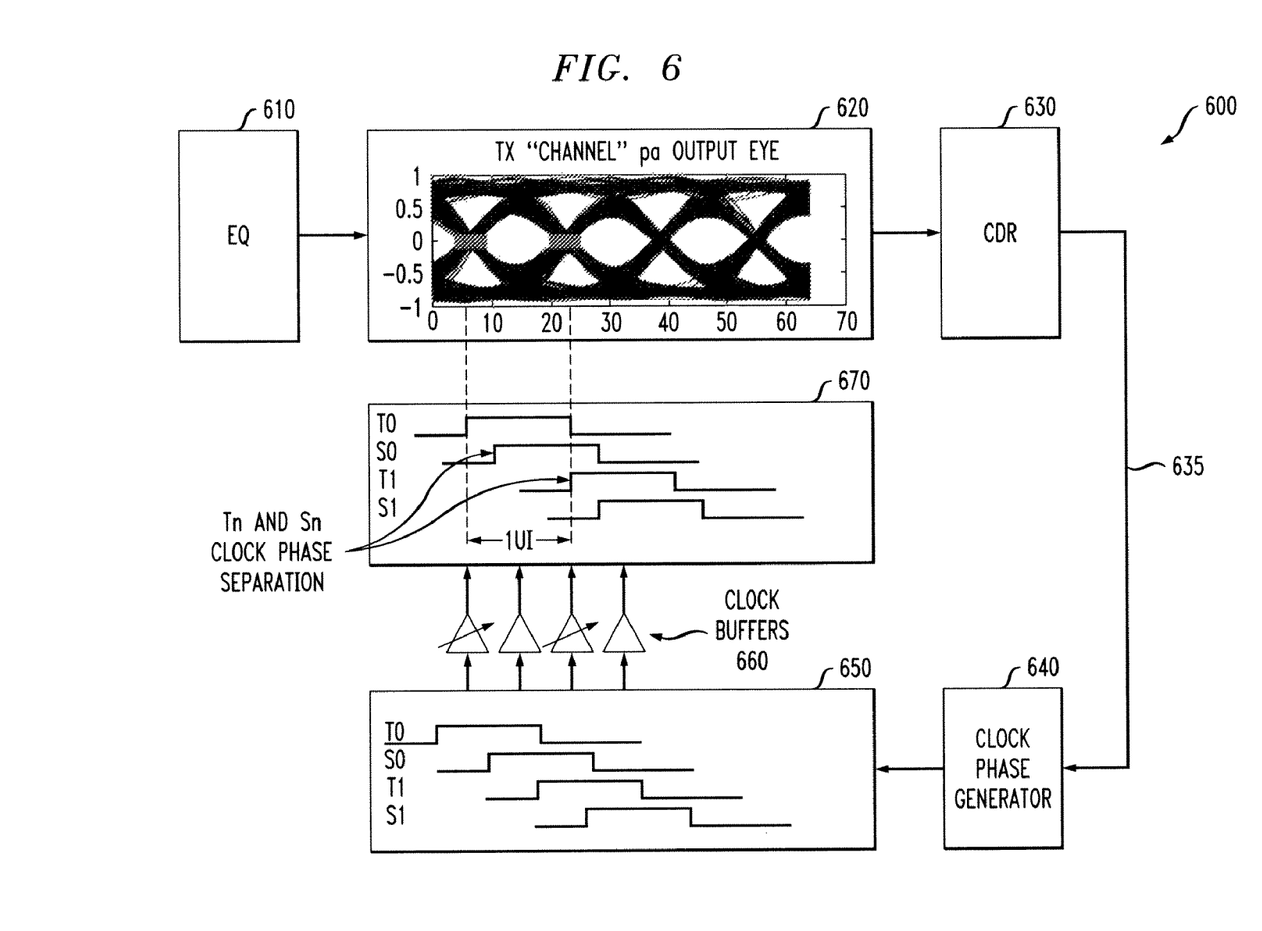
FIG. 6 illustrates a CDR clock phase generator incorporating features of the present invention to generate an early CDR data sampling clock phase.

FIG. 6 illustrates a CDR clock phase generator 600 incorporating features of the present invention to generate an early CDR data sampling clock phase. As shown in FIG. 6, a received signal is equalized by an equalizer 610, such as an adaptive equalizer. A CDR 630 processes the equalized signal 620 and generates a reference clock signal 635 of a given frequency. An ideal clock phase generator 640 generates uniformly spaced clocks 650. The generated clocks 650 are applied to clock buffers 660 that are trimmed at initialization to compensate for mismatches at the output of the clock generator 640. The disclosed CDR clock phase generator 600 satisfies the well-known causality principle yet creates an early CDR data sampling clock phase.

In order to generate an early CDR data sampling clock phase, the clock buffers 660 are configured to delay the transition clocks, Tn, but not the data sampling clocks, Sn. The delay applied by the clock buffers 660 to the two transition clocks, T0 and T1, can be the same or different amounts. In addition, the delay applied to each of the two transition clocks, T0 and T1, can be a fixed or dynamic delay value. Thus, there can be independent control of the phase of the transition clocks, Tn. Each eye can be individually controlled since the two transition clocks, T0 and T1, have their own delay. In one exemplary implementation, the delay introduced to the transition clocks, Tn, is gradually increased until the noise margin is optimized (see FIG. 8).

The transition edges are delayed and the transition edge separation (or spacing) is maintained at one unit interval (UI). The CDR realigns the transition clock edges to the data eye, while the data sampling clock phase is brought earlier in time. In this manner, the transition clocks, Tn, are delayed with respect to the data sampling clocks, Sn. In other words, the spacing between the transition clocks, Tn, and the data sampling clocks, Sn, becomes shorter, to generate an early clock.

The resulting non-uniform set 670 of transition clocks, Tn, and data sampling clocks, Sn, is shown in FIG. 6.

Late Clock Placement

According to another aspect of the present invention, a clock generation technique is provided to delay the data sampling clock phase in time. This late clock generation scheme is useful, for example, for classical DFE applications. This delay in data sampling clock phase allows the ISI removal output to settle, as discussed above.

Figure 7:
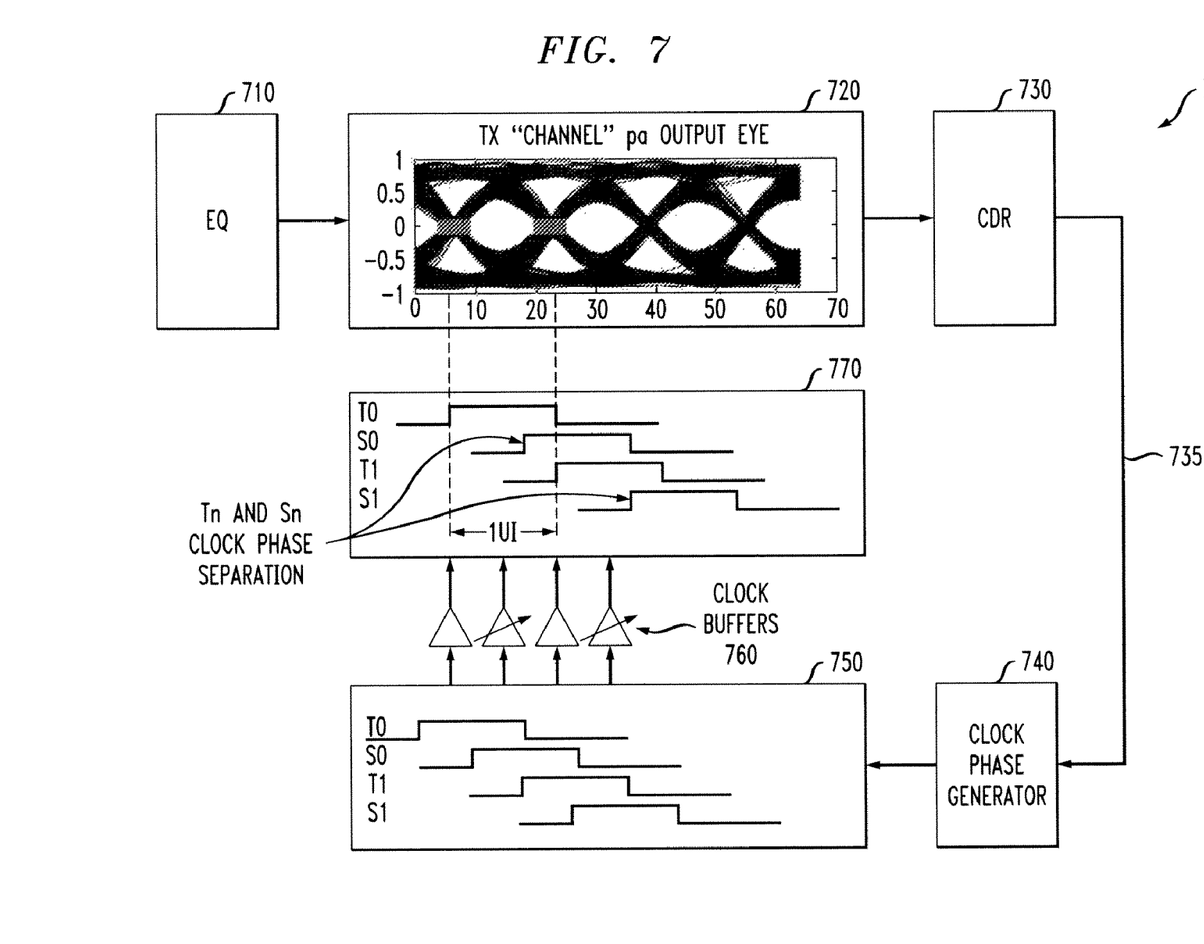
FIG. 7 illustrates a CDR clock phase generator incorporating features of the present invention to generate a late CDR data sampling clock phase.

In the disclosed late clock generation technique, a CDR recovers the clocks from the incoming signal. The recovered clock phases will not be uniformly spaced because of device mismatches. The clock buffers are initially trimmed, using known methods, to uniformly space the data and transition latch sampling clock edges. In the next phase, only the data latch sampling clock phases are delayed by a known delay (with respect to the transition clocks, Tn). Thus, the separation between the data sampling clock edges and transition latch sampling clock edges is increased. Generally, the position of each data sampling clock, Sn, depends on the corresponding transition clock, Tn. Thus, the separation between the data sampling clock edges and transition latch sampling clock edges is increased. By providing a known delay to all transition edges, the transition edge separation can be kept to one unit interval (UI). The CDR will thus realign the transition clock edges to the data eye, while the data sampling clock phase is brought earlier in time. While the relative distribution between the transition clocks, Tn, and data sampling clocks, Sn, increases, the CDR 730 still locks on the transition clocks, Tn. Thus, the delayed data sampling clocks, Sn, provides a late clock phase.

By providing a known delay to all data sampling clock edges, the transition edge separation is kept to one unit interval (UI). The CDR will realign the transition clock edges to transitions in the data eye, while the data sampling clock phase is moved later (delayed) in time.

FIG. 7 illustrates a CDR clock phase generator 700 incorporating features of the present invention to generate a late CDR data sampling clock phase. As shown in FIG. 7, a received signal is equalized by an equalizer 710, such as an adaptive equalizer. A CDR 730 processes the equalized signal 720 and generates a reference clock signal 735 of a given frequency. An ideal clock phase generator 740 generates uniformly spaced clocks 750. The generated clocks 750 are applied to clock buffers 760 that are trimmed at initialization to compensate for mismatches at the output of the clock generator 740.

The delay applied by the clock buffers 760 to each of the two data sampling clocks, S0 and S1, can be a fixed or dynamic delay value. Thus, there can be independent control of the phase of the data sampling clocks, Sn. Each eye can be individually controlled since the two data sampling clocks, S0 and S1, have their own delay. In one exemplary implementation, the delay introduced to the data sampling clocks, Sn, is gradually increased until the noise margin is optimized (see FIG. 8).

Figure 8:
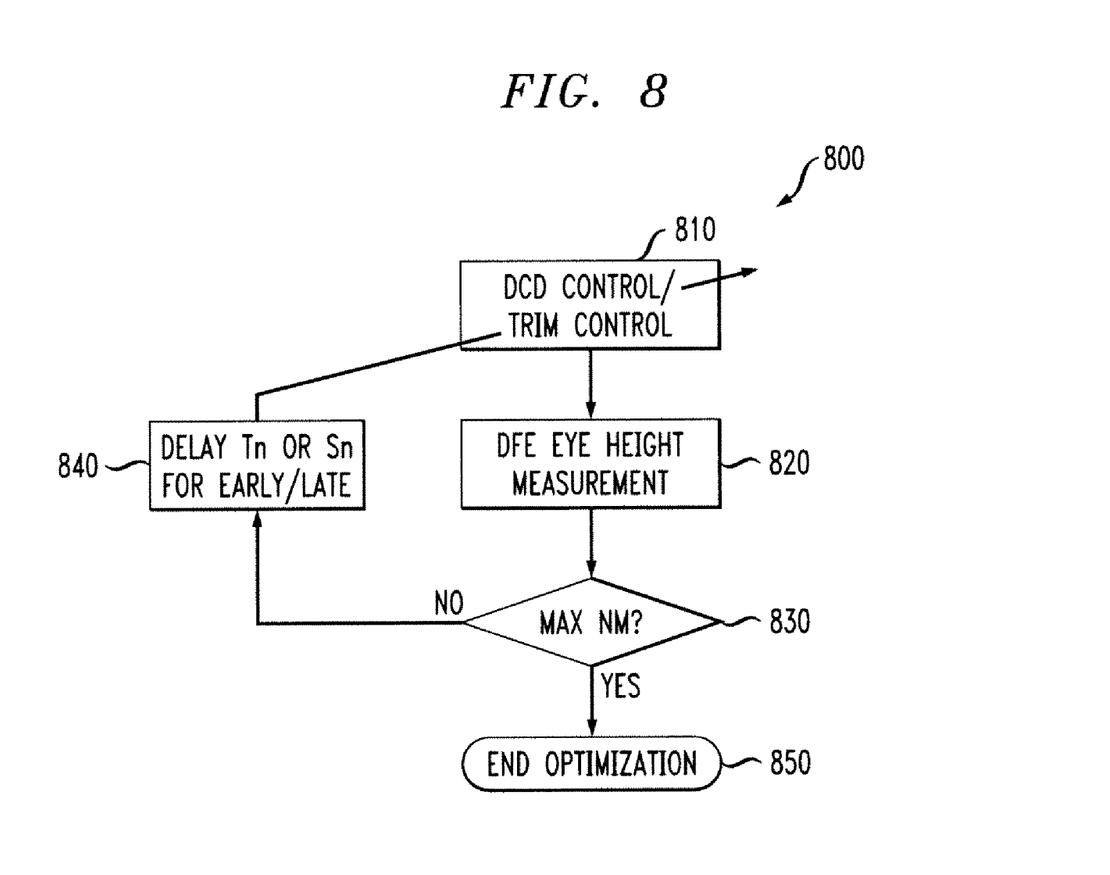
FIG. 8 is a flow chart describing an exemplary implementation of a feedback control loop for early-late clock phase generation in accordance with the present invention.

FIG. 8 is a flow chart describing an exemplary implementation of a feedback control loop 800 for early-late clock phase generation in accordance with the present invention. Generally, the feedback control loop 800 tracks the maximum margin to complete the control loop for data sampling clock phase optimization.

The clock trim or application of controlled Duty Cycle Distortion (DCD) is applied during step 810, in a known manner, followed by a DFE eye height margin calculation during step 820. For example, the height of the DFE eye can be measured during step 820, approximately associated with the outer circle 480 (as discussed above in conjunction with FIG. 4).

A test is performed during step 830 to determine if the maximum noise margin has been measured. If it is determined during step 830 that the maximum noise margin has not been measured, then the delay on the transition clocks, Tn, or sample clocks, Sn, are increased for an early or late clock generation implementation, respectively. If, however, it is determined during step 830 that the maximum noise margin has been measured, then the early/late optimization process ends during step 850.

A processor, such as an 8051 microcontroller from Intel Corp., can implement the feedback loop 800. Alternatively, after characterization, a fixed trim or DCD distortion can be applied to achieve early/late sampling clock generation in a more inexpensive manner.

CONCLUSION

While exemplary embodiments of the present invention have been described with respect to digital logic blocks, as would be apparent to one skilled in the art, various functions may be implemented in the digital domain as processing steps in a software program, in hardware by circuit elements or state machines, or in combination of both software and hardware. Such software may be employed in, for example, a digital signal processor, micro-controller, or general-purpose computer. Such hardware and software may be embodied within circuits implemented within an integrated circuit.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits. The invention can also be implemented in one or more of an integrated circuit, a digital signal processor, a microprocessor, and a micro-controller.

A plurality of identical die are typically formed in a repeated pattern on a surface of the wafer. Each die includes a device described herein, and may include other structures or circuits. The individual die are cut or diced from the wafer, then packaged as an integrated circuit. One skilled in the art would know how to dice wafers and package die to produce integrated circuits. Integrated circuits so manufactured are considered part of this invention.

It is to be understood that the embodiments and variations shown and described herein are merely illustrative of the principles of this invention and that various modifications may be implemented by those skilled in the art without departing from the scope and spirit of the invention.

We claim:

1. A method for generating one or more non-uniform clock signals, said method comprising:
    generating a plurality of transition clock signals and data sampling clock signals having a substantially uniform phase separation; and
    applying at least one of said transition clock signals and not said data sampling clock signals to one or more delay elements to generate said one or more non-uniform clock signals, wherein said one or more non-uniform clock signals has a non-uniform phase separation relative to said generated transition clock signals, wherein said delay is based on a sampling point for a threshold-based Decision Feedback Equalization.

2. The method of claim 1, wherein said delaying step delays said transition clock signals with respect to said data sampling clock signals.

3. The method of claim 1, wherein said generating step further comprises the step of processing a received signal using a clock and data recovery system.

4. The method of claim 1, further comprising the step of increasing a delay amount introduced by said delaying step until a predefined stopping criteria is satisfied.

5. The method of claim 4, wherein said predefined stopping criteria evaluates a noise margin.

6. The method of claim 1, wherein a delay amount introduced by said delaying step is a fixed delay amount.

7. The method of claim 1, wherein a delay amount introduced by said delaying step is a dynamic delay amount.

8. The method of claim 1, wherein a plurality of said transition clock signals have independent phase control.

9. The method of claim 1, further comprising the step of employing said one or more generated clock signals in a threshold-based decision feedback equalizer.

10. The method of claim 1, wherein said step of delaying at least one of said transition clock signals advances at least one of said data sampling clock signals.

11. A method for generating one or more non-uniform clock signals, said method comprising:
    generating a plurality of transition clock signals and data sampling clock signals having a substantially uniform phase separation; and
    applying at least one of said data sampling clock signals and not said transition clock signals to one or more delay elements to generate said one or more non-uniform clock signals, wherein said one or more non-uniform clock signals has a non-uniform phase separation relative to said generated data sampling clock signals, wherein said delay is based on a sampling point for a threshold-based Decision Feedback Equalization.

12. The method of claim 11, wherein said delaying step delays said data sampling clock signals with respect to said transition clock signals.

13. The method of claim 11, wherein said generating step further comprises the step of processing a received signal using a clock and data recovery system.

14. The method of claim 11, further comprising the step of increasing a delay amount introduced by said delaying step until a predefined stopping criteria is satisfied.

15. The method of claim 14, wherein said predefined stopping criteria evaluates a noise margin.

16. The method of claim 11, wherein a delay amount introduced by said delaying step is a fixed delay amount.

17. The method of claim 11, wherein a delay amount introduced by said delaying step is a dynamic delay amount.

18. The method of claim 11, wherein a plurality of said transition clock signals have independent phase control.

19. The method of claim 11, further comprising the step of employing said one or more generated clock signals in a classical decision feedback equalizer.

20. A clock and data recovery clock phase generator for generating one or more non-uniform clock signals, comprising:
    a clock and data recovery system for processing a received signal to generate a plurality of transition clock signals and data sampling clock signals having a substantially uniform phase separation; and one or more delay elements for delaying at least one of said transition clock signals and not said data sampling clock signals to generate said one or more non-uniform clock signals, wherein said one or more non-uniform clock signals has a non-uniform phase separation relative to said generated transition clock signals, wherein said delay is based on a sampling point for a threshold-based Decision Feedback Equalization.

21. A clock and data recovery clock phase generator for generating one or more non-uniform clock signals, comprising:

a clock and data recovery system for processing a received signal to generate a plurality of transition clock signals and data sampling clock signals having a substantially uniform phase separation; and one or more delay elements for delaying at least one of said data sampling clock signals and not said transition clock signals to generate said one or more time-shifted clock signals, wherein said one or more non-uniform clock signals has a non-uniform phase separation relative to said generated data sampling clock signals, wherein said delay is based on a sampling point for a threshold-based Decision Feedback Equalization.

* * * * *